United States Patent [19]

Glorioso

[11] Patent Number: 4,852,269
[45] Date of Patent: Aug. 1, 1989

[54] COMBINED SEWAGE AND LIME SLUDE TREATMENT PROCESS

[75] Inventor: John D. Glorioso, Clearwater, Fla.

[73] Assignee: Enviro-Gro Technologies, Inc., Baltimore, Md.

[21] Appl. No.: 243,485

[22] Filed: Sep. 12, 1988

Related U.S. Application Data

[63] Continuation-in-part of Ser. No. 924,630, Oct. 29, 1986, Pat. No. 4,761,893.

[51] Int. Cl.⁴ .................................... F26B 3/24
[52] U.S. Cl. ........................................ 34/11; 34/35; 34/86; 34/102; 34/95; 432/215
[58] Field of Search .............. 34/11, 35, 86, 102, 34/9, 95; 432/215

[56] References Cited

U.S. PATENT DOCUMENTS 4,245,396  1/1981  Maffet ..................................... 34/14

Primary Examiner—Henry Bennett
Attorney, Agent, or Firm—Lowe, Price, LeBlanc, Becker & Shur

[57] ABSTRACT

A process is described for combining the disposal of sewage sludge and lime sludge economically by recalcining the lime sludge to product lime for municipal water treatment, and utilizing the excess heat from the recalcining process to dry and pelletize sewage sludge or to supplement the heat required to dry and pelletize said sewage sludge. The sewage sludge pellets then are produced in uniform sizes and have excellent value as a soil conditioner.

10 Claims, 2 Drawing Sheets

COMBINED SEWAGE AND LIME SLUDE TREATMENT PROCESS

This application is a continuation-in-part of my co-pending patent application entitled IMPROVED SLUDGE TREATMENT PROCESS, Ser. No. 924,630 filed Oct. 29, 1986, which is now U.S. Pat. No. 4,761,893 the disclosure of which is hereby incorporated by reference.

BACKGROUND OF THE INVENTION

In my above identified patent application there is described an improved process for drying and pelletizing sewage sludge to form pellets of small and uniform sizes. Such pellets then are suitable for use as a soil conditioner, or as a fuel. While it has been known for many years that sewage sludge could be pelletized and could be used as a fuel or soil conditioner, production of pellets in uniform sizes was not achieved prior to my invention.

In my sludge treatment process, dewatered sludge cake was mixed with a previously -pelletized sludge particles and passed through a dryer. The particles of previously dried sludge assist in pelletizing the sludge cake by forming a nucleus for the formation of the pellets. The exiting materials then are separated from the of gas stream and clarified. Fines are removed and conveyed to a recycle bin. Pellets of the desired size are separated and routed to storage for shipment or sale. Oversized particles are routed to a crusher and crushed. The crushed particles are then mixed with the fines and recycled with the incoming dewatered sludge cake. In this way, the product produced for sale, is constituted only of pellets of uniform size and does not contain oversized particles or fines.

While the process requires the use of a fuel for drying the sludge cake mixture, as described in my application, the fuel could be a fossil fuel, or coal or waste wood chips or the like, or a mixture. While the fuel could present a major expense, in many municipalities, there is no alternative means to dispose of sewage sludge.

One unacceptable alternative in many municipalities is the dumping of the sludge in a nearby river. Obviously, federal regulations now prohibit such practices. Another alternative would be to dispose of the sludge in a landfill. However, in the case of many municipalities, landfill capacity is either not present or will not be in the predictable future.

In addition to sewage sludge, in many municipalities the municipal water must also be treated to "soften" it for distribution. In many municipalities the water source contains excessive concentrations of calcium and magnesium salts. Such "hard" water requires excessive quantities of soap, and leave scum which many stain fabrics. It is desirable then to treat the water to remove these calcium and magnesium salts before distribution.

A common water treatment process involves the addition of lime, or lime and soda ash, to precipitate the calcium and magnesium salts as calcium carbonate and magnesium hydroxide. This process however results in a by-product called lime sludge which also presents a disposal problem. Typically, the lime sludge is initially treated to remove the magnesium hydroxide and then is recalcined to regenerate lime from the sludge for reuse in the water treatment process. This then minimizes the disposal problem relative to water treatment. Recalcination, is typically carried out at temperatures of 1600°–1800° F. and produces off gases at 300°–350°. This then also produces a requirement for fuel in a situation wherein alternate disposal means are not available.

SUMMARY OF THE INVENTION

It has been discovered however that the pelletizing of sewage sludge and the recalcination of lime sludge can be combined in a process wherein the off gases from recalcination are used to dry the sewage sludge or to supplement the fuel requirement for the pelletizing process. This then results in a reduction in the fuel requirement for the pelletizing process, and in addition, in view of the fact that some lime will be carried forward in the off gases, results in a lime enrichment of the sludge pellets produced, which enhances their use as a soil conditioner.

Accordingly, it is an object of this invention to provide a system for pelletizing sewage sludge to produce pellets of uniform size efficiently and economically.

It is another object of this invention to provide a combined system for pelletizing sewage sludge and recalcining lime sludge wherein the heat generated by the recalcining process is used to at least in part to dry the sewage sludge.

It is yet another object of this invention to provide a combined system for disposing of the sludge by-products of a water treatment facility and a wastewater facility by recalcining the lime sludge from the water treatment facility for reuse as a softening agent for a municipal water system, and utilizing the heat generated by the recalcining process to at least in part dry the sewage sludge from the wastewater treatment plant wherein the sludge is admixed with previously pelletized particles, pelletized in a drier and clarified whereby only particles of uniform size will be separated from the oversized particles which are crushed and the fines which are admixed with the crushed oversized particles and recycled.

BRIEF DESCRIPTION OF THE DRAWINGS

These and other objects will become readily apparent with reference to the drawings and following description wherein.

DETAILED DESCRIPTION OF THE INVENTION

Figure 1:
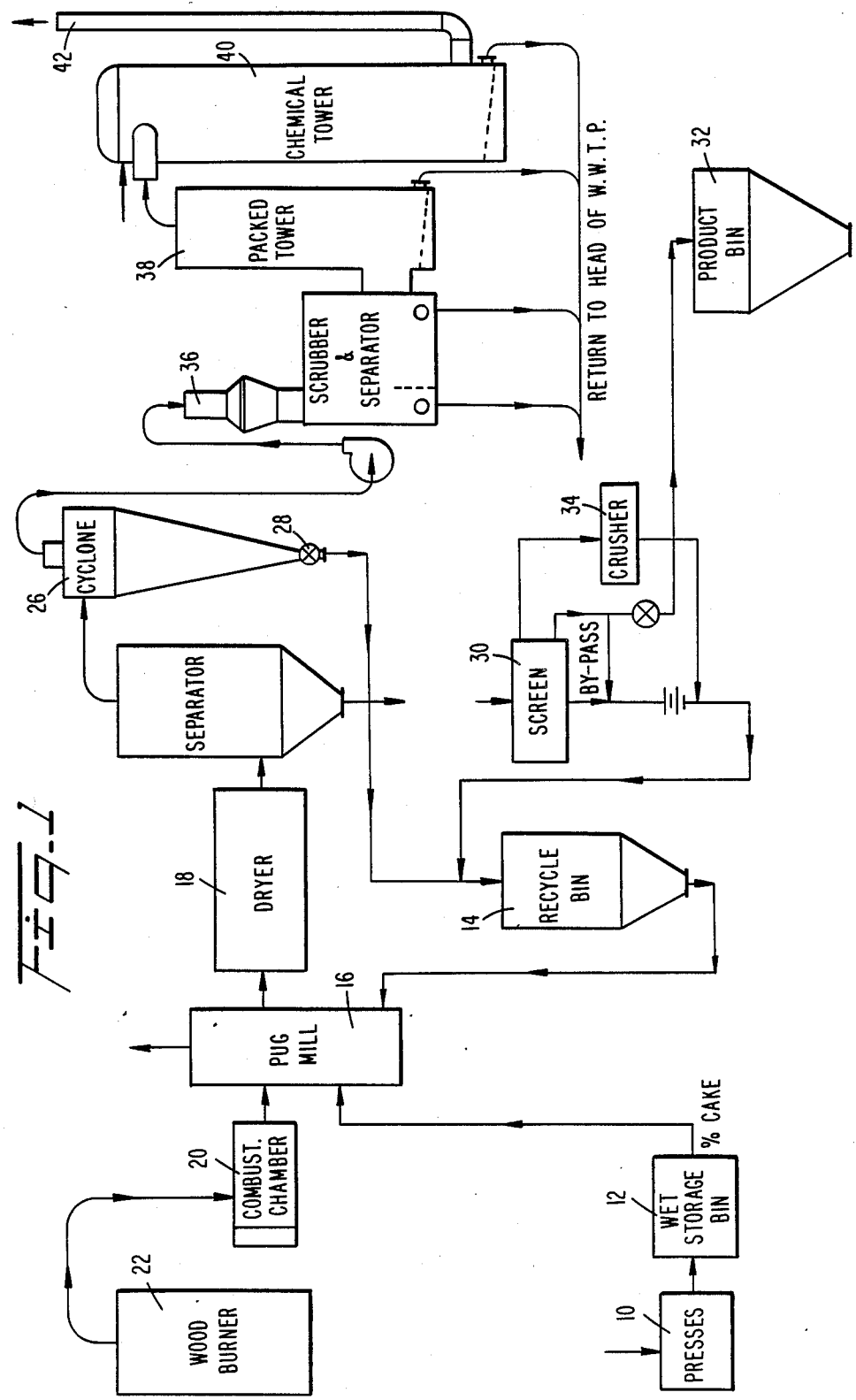
FIG. 1 is a schematic drawing of a typical sewage sludge pelletizing system of this invention.

With attention to the drawings, FIG. 1 is a schematic representation of the sludge pelletizing process as described and claimed in my above identified parent patent application. As described therein liquid sewage sludge may contain up to 90% to 99% water. According to conventional techniques, this sludge is subjected to floccuation wherein the sludge particles agglomerate so that when the liquid sewage sludge enters a mechanical press 10 it can be dewatered down to about 80% water and then rerouted to a storage bin 12. The material from bin 12 is identified as wet sludge cake.

Wet sludge cake from storage bin 12 and recycled dried sludge pellets and fines from recycled bin 14 are then routed by conventional conveyor to a mixing pug mill 16. The mixture from pug mill 16 then enters the drier 18. Heat for the drier 18 may be supplied by a conventional furnace 20 and the heat from furnace 20 may be supplemented by for example a solid fuel burner 22 which may burn woodchips or the like. In the alternative, burner 22 could be fueled with sludge pellets and/or the combustion chamber 20 could be fueled with sludge pellets. As will be subsequently explained, the process of this invention utilizes supplemental heat to the combustion chamber derived from a recalcining process. This process will be subsequently described in connection with FIG. 2. The sludge drying process generally operates at temperatures between 600°–1000° F. and preferably around 800° F. The drier preferably is a rotary drier.

Pelletized sludge together with the drier off gases exit drier 18 and enter a separator can 24. The temperature of this stream is about 180° F.

The separator can 24 is a vertically disposed cyclone separator that use gravity and centrifugal force to remove about 90% or more of the solids from the gas stream. The gas stream then exits to the separator into a cyclone 26 where the fines are removed and the fines then exit cyclone 26 at exit port 2 and are added to the recycled bin 14.

Cyclone 26 could be a conventional cyclone system but preferably is the separator described in U.S. Pat. No. 4,357,152 for efficient removal of the solids from the gas stream. Solids from separator 24 then enter the screen system 30. Preferably the screen system 30 is a rotary screen which also acts as a cooler. In the preferred embodiment of this invention, ⅛ inch and 3/32 inch screens are provided. Material larger in diameter than 3/32 inch is classified as oversize. Particles having diameters between ⅛ and 3/32 inch are the product and are routed to a product bin 32. The oversize particles are then routed to a conventional crusher 34 which may be a roller or the like. The crushed particles are then routed to the recycle bin 14. The fines passing through the ⅛ screen then exit the screen and are also routed to the recycled bin. As shown in FIG. 1 in the event a need for more recycle material, product may bypass the product bin and be routed to the recycle bin.

The air stream exhausted from cyclone 26 then typically passes through a scrubber 36, a packed tower 38, and a chemical tower 40 before being exhausted to the atmosphere through stack 42. This procedure will eliminate any solids remaining beyond that permitted by air pollution regulations as well as any noxious odors. The liquid from the air stream 36, 38, 40 and 42 is then returned to the head of the wastewater treatment plant to be combined with the liquid sludge being admitted to press 10 for recycling.

During normal operation the product pellets have a optimum size of about ⅛" dia. and constitute about 10% of the solids passing through the system.

As previously indicated the preferred entrance temperature at the rotary drier is about 800° F. The temperature of the air stream then exiting the drier is about 180° F. After cooling in the rotary cooler screen system 30 the recycled materials in the recycle bin are at a temperature of about 140° F.

As previously indicated the preferred entrance temperature at the rotary drier is about 800° F. The temperature of the air stream then exiting the drier is about 180° F. After cooling in the rotary cooler screen system 30 the recycled materials in the recycle bin are at a temperature of about 140° F.

Figure 2:
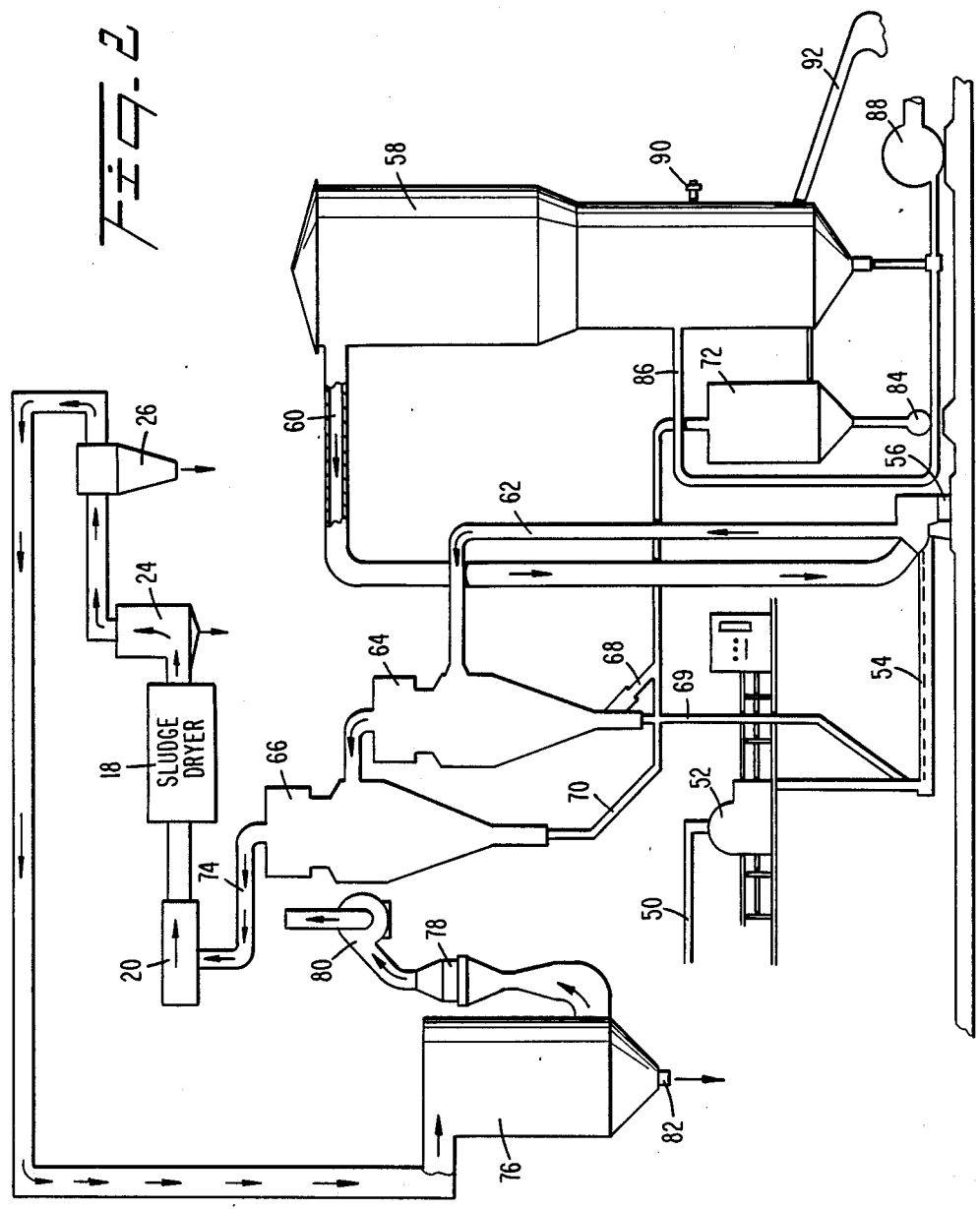
FIG. 2 is a schematic drawing of a combined lime sludge recalcining and sewage sludge pelletizing system of this invention.

With attention to FIG. 2, as indicated above, in communities where the water contains excessive quantities of calcium and magnesium, it is necessary to treat the municipal water to remove these materials. A common process for softening municipal water involves the use of lime to precipitate the calcium and magnesium as calcium carbonate and magnesium hydroxide. Typically, a ton of lime will produce about two and one half tons of lime sludge. From an economic standpoint, and from a environmental standpoint, it is desirable to reclaim the lime from the lime sludge for reuse rather than attempting to dispose of the sludge.

It has been known for some time that lime sludge can be recalcined to produce lime for reuse. A preferred calciner is marketed by Dorr-Oliver, Inc. of Stanford, Conn. under the tradename "FluoSolids". This fluidized bed combustion unit yields an off gas having a temperature of about 1650° F. and is fueled by either gas or oil. This invention then involves utilization of the heat from the off gas to dry sewage sludge or supplement the fuel requirement in combustion chamber 20 for drier 18.

FIG. 2 is schematic representation of the overall combined processes for processing both sewage sludges and lime sludge utilizing the heat of the off gas from the recalcining process as will be subsequently described. It should be noted that the sewage sludge treatment system shown in FIG. 2 is a simplified version of FIG. 1 with many of the features therein not shown.

The lime sludge to be processed is initially treated to remove the magnesium hydroxide. This procedure (not shown) is conventional and may involve separation based upon specific gravity. Accordingly the feed to the system is essentially calcium carbonate in a water containing sludge.

The lime sludge is conveyed by conduit 50 to a filter 52 wherein the cake is reduced to about 65% solids. The cake is then conveyed with previously calcined solids via mixer 54 to a cage mill 56. The lime cake is admixed then in cage mill 56 with off gas from the calciner 58 via conduit 60. This off gas is essentially at a temperature of 1650° F. The lime cake admixed in mill 56 is then conveyed pneumatically via conduit 62 to a first cyclone 64 and from first cyclone 64 to a second cyclone 66. The output in solids from cyclones 64 and 66 via conduits 68 and 70 flows into a calciner feed bin 72 with a portion diverted via conduit 69 to mixer 54. The off gas from cyclone 66 then is at a temperature of about 325° F. and is conveyed via conduit 74 to combustion chamber 20, or in the alternative (not shown) directly to the drier 18. The sludge in drier 18 then exits into separator can 24 as pellets entrained in off gas. The off gas from the separator 24 then flows through cyclone system 26 and solids from separator can 24 and cyclone 26 are processed as described above in connection with FIG. 1. The off gas from cyclone 26 then enters a scrubber system shown generally at 76 wherein the off gas is cleaned of noxious odors and any remaining impurities. It then flows through a venturi 78 via an exhaust fan 80 to be expelled to the atmosphere. The affluent from the scrubber exiting at outlet 82 may be returned to the head of the sludge treatment system to be admixed with incoming sewage sludge.

Calciner 58 is fed via feeder 84 and conduit 86. Typically a fluidizer air blower 88 is used to convey the partially dried sludge pneumatically. As noted above in the preferred embodiment of this invention a Dorr-Oliver fluidized bed combustion system is used. This system utilizes either natural gas or oil which is fed through the calciner at inlet 90. The off gas is removed via conduit 60 as noted above, and pelletized lime exits the calciner at outlet 92.

In a typical system, an output of 25 dry tons of lime will provide sufficient heat to dry approximately 8 dry tons of municipal sludge. The output from cyclone 66 from a lime solids feed of above 65% should be about 10,700 acfm at 325° F. The lime recovery from such a system then is about 56%, or on an input of 44.6 tons dry weight of lime sludge the output of 25 dry tons will be produced.

As also noted above, the off gas from cyclone 66 will contain some lime fines. These lime fines become admixed with the sludge to be dried so that the pellets produced as products will not only be of small and uniform size but also will be enriched with lime. These enriched pellets then will provide an excellent soil conditioner supplement and clearly the overall process of this invention will result an economic means for disposing of both municipal sludge and lime sludge from a municipal water treatment plant.

It will be obvious to those skilled in the art that this invention is not intended to be limited to the specific type of calciner utilized or the equipment disclosed. Equivalent types of processing equipment can be substituted within the scope of this invention.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A combined process for pelletizing sewage sludge and recalcining lime sludge comprising:
   providing a calciner, feeding said lime sludge into said calciner, producing lime therein and a heated off gas;
   mixing said sewage sludge with recycled, previously dried sludge particles and pellets;
   drying said mixture in a thermal drier utilizing as a heat source the heated off gas from said calciner, at least in part to form pellets and particles thereof;
   conveying the dried pellets and particles and drier off gas to a low velocity gas/solids separator and separating and collecting the pellets and a substantial portion of the particles;
   clarifying the collected pellets and particles and separating and collecting the pellets of a predetermined size, the undersized pellets and particles and the oversized pellets;
   mechanically crushing the oversized pellets and collecting the crushed pellets and undersized pellets and particles;
   and recycling the collected undersized pellets and particles and crushed pellets by mixing said recycled materials with said incoming sludge to the drier.

2. The process of claim 1 further comprising, providing a gas/solids separator system; routing the off gas from the calciner through said system, collecting solids therefrom and recycling said solids with said lime sludge to the calciner.

3. The process of claim 2 wherein the incoming lime sludge is admixed with the off gas from the calciner and the mixture routed through the gas/solids separator system, the off gas from said separator system being routed to the sewage sludge drier.

4. The process of claim 3 wherein said gas/solids separator system comprises a pair of cyclones in series.

5. The process of claim 1 further comprising collecting the off gas from the sewage sludge gas/solids separator, removing substantially all of any fines entrained therein and recycling said fines with the crushed pellets and undersized pellets and particles.

6. The process of claim 1 wherein the sewage sludge drier is a rotary drier.

7. The process of claim 1 wherein the entrance temperature at the sludge drier is about 800° F.

8. The process of claim 1 wherein the calciner off gas is at a temperature of about 325° F.

9. The process of claim 1 wherein said lime sludge comprises approximately 65% solids, by weight.

10. The process of claim 1 wherein the step of separating the sewage sludge pellets and particles from the off gas comprises separating over 90% of the solids exiting said drier.

* * * * *